Aug. 14, 1962 J. J. CAUBET 3,049,384
BEARING
Filed Oct. 27, 1958
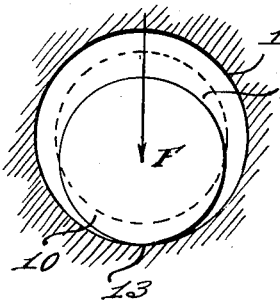
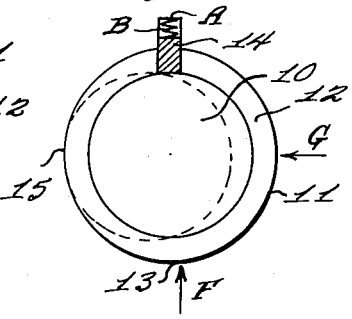
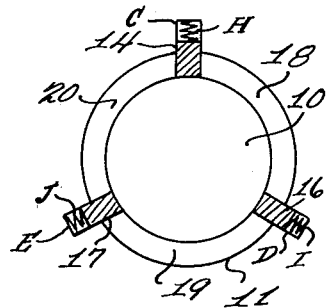
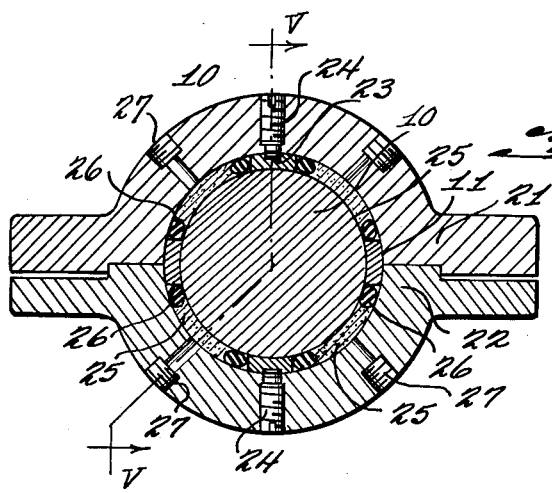
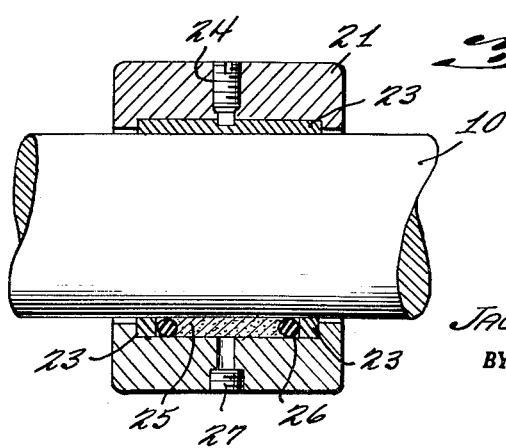
INVENTOR.
JACQUES JEAN CAUBET
BY
Irwin S. Thompson
ATTORNEY 3,049,384
BEARING
Jacques Jean Caubet, 2 Rue de la Reclusiere,
Saint-Chamond, France
Filed Oct. 27, 1958, Ser. No. 769,674
3 Claims. (Cl. 308—240)

The present invention has for its object a journal bearing specially designed to carry an oscillating or slowly rotating shaft under a heavy load, with a low coefficient of friction.

This bearing is characterised in that the shaft, instead of resting on the bearing proper and in contact therewith, or on rolling members, is carried by incompressible masses of lubricant formed between the bearing and the shaft, and retained in position by means of fluid-tight members.

In this way, the load is carried by lubricating elements, the internal pressure of which is automatically adjusted to the value of the load. Since the shaft is not in contact with the bearing, but is so to speak carried by the masses of lubricant, it can be readily displaced without risk of seizure.

The invention will be described in more detail with reference to the accompanying drawings, in which:

FIG. 1 is a diagram explaining the arrangement of a shaft in its housing in the case of bearings of the usual kind.

FIG. 2 is a diagrammatic view explaining the bearing according to the invention with a sealing member for the lubricant.

FIG. 3 is a diagrammatic view similar to that of FIG. 2 with three lubricant sealing members.

FIG. 4 is a view in cross-section of one form of embodiment of the bearing;

FIG. 5 is a view in longitudinal cross-section taken along the line V—V of FIG. 4.

If the shaft is given the reference number 10, and 11 is the internal surface of the bearing, in the usual arrangements, the space 12 comprised between the two surfaces is filled with lubricant, as shown in FIG. 1.

It is assumed that initially and without load, the shaft 10 has the position shown in dotted lines. In spite of the fact that the annular space is filled with lubricant, under the effect of a load F, the shaft 10 comes into contact with the bearing at 13; in fact, during this movement, the space 12 comprised between the outer surface of the shaft 10 and the inner surface 11 of the bearing remains unchanged, since the lubricant contained in this space can make any suitable relative movement.

If, along the direction of the load F, there is arranged a member 14 which is supported on the shaft 10 (see FIG. 2) and which keeps in contact with said shaft by virtue of a longitudinal movement in its housing A, and of its spring B, this member 14 prevents the displacement of the lubricant contained in the space 12 and the shaft 10 is thus supported without being able to come into contact with the bearing at 13.

This result is however no longer attained if the load has a different direction such as G, as the shaft can then come into contact with the bearing at 15.

If, instead of a single member 14, a number of these are employed, for example three, 14, 16 and 17, longitudinally movable in their housings C, D and E, uniformly spaced apart as shown in FIG. 3 and permanently supported on the shaft 10 by means of their springs H, I and J, the retention of the bearing is ensured, whatever may be the orientation of the load. Between two adjoining members, in each of the spaces 18, 19 and 20, there is imprisoned a volume of lubricant, grease or the like, on which the support of the shaft 10 is effected.

In accordance with these considerations, a form of embodiment is given by way of example only and without any implied limitation, in FIGS. 4 and 5.

In this example, the bearing formed by the bushings 21, 22, arranged to fit one on the other, receives the shaft 10 which is intended to rotate or to oscillate at low speeds and under a very heavy load.

Between the shaft 10 and the inner surface 11 of the bushings 21 and 22 is interposed a jacket 23. This jacket is held in position by studs 24 which can be maintained in place from the exterior by screws or other means. This jacket has four longitudinal and circumferential pockets or channels 25 therein. Along the periphery of each channel is mounted a sealing ring 26 of the type known as an "O ring."

The shaft 10 being maintained in a concentric position, each pocket or channel 25 is filled with lubricant from a lubricating point 27; the filling pressure is chosen so as to force the sealing members, the rings O for example, to the bottoms of their housings; in this way, there are formed in compressible masses of lubricant which serve to support the shaft 10.

The jacket 23 is arranged in such manner as to withstand without bending the thrust due to the tangential component of the normal pressure which balances the applied load. The sealing rings 26 are provided in order to prevent any flow of lubricant from one channel 25 to another.

Under the very heavy pressures applied by the shaft 10, fittings 26 such as the rings "O" would be forced out more readily as the clearances between the shaft 10 and the jacket 23 increased. In order to maintain the widest possible machining tolerances and suitable clearances, the substance used for filling the channels is chosen not only for its smallest possible coefficient of friction, but also for the highest possible viscosity and the greatest possible resistance to deformation. The lubricating agents which best comply with these conditions are those which permit of clearances of several tenths of a millimetre between the members 10 and 23, under heavy loads, without extrusion of the rings 26. To this end, a compact mixture of molybdenum bisulphide, graphite and greases having a high resistance to shear is very suitable.

By way of example, a shaft 100 mm. in diameter is mounted in a bearing in accordance with the arrangement of FIGS. 4 and 5, with clearances of one-tenth of a millimetre. With a load of 200 kgs. per sq. cm., at a speed of rotation of one revolution per minute, a coefficient of friction of less than 0.005 is obtained with the grease referred to above.

The plastic lubricant employed, under the pressure which is applied to it, no longer obeys the hydrostatic law of transmission of pressure. It behaves in accordance with the laws of rheology applicable to the slip of plastic materials (or to the slip of land in geology). In accordance with these laws of rheology, pressure is only fully transmitted in the direction of the application of the force, and has only an attenuated effect in a direction at right angles to this latter.

In the instant bearing, the load transmitted by the shaft is applied at right angles to the surface of contact with the grease, but has only an extremely small effect in the direction at right angles. In the example given above, the sealing joints are only subjected to a very small pressure of the order of 20 kgs. per sq. cm. as a maximum. It is for this reason that an ordinary joint, such as a simple rubber ring of ordinary quality, is sufficient to enclose the volume of viscous lubricant, without any leakage.

It will be understood that in the case of slow movement of shafts under a heavy load, and in this case only, the bearing is fundamentally different from the usual constructions with fluid lubricant of fairly high pressures, which involve the necessity of very small clearance and complex fluid-tightness devices.

What I claim is:

1. A bearing for a shaft rotating slowly under a heavy load comprising a shaft, an annular bushing member disposed round and in spaced relationship to said shaft, a jacket member interposed between said shaft and said annular bushing member, a plurality of channels disposed in and circumferentially arranged around said jacket member, each channel having disposed therein a non-compressible lubricant of pasty consistency on which said shaft rides and is supported, a sealing member disposed at the periphery of each channel to maintain said non-compressible lubricant therein, and filling means disposed in said annular bushing member, said filling means being in communication with each one of said channels to fill said channels with said non-compressible lubricant and to maintain said channels full therewith.

2. A bearing according to claim 1 in which said non-compressible lubricant consists of a combination, of grease, graphite and molybdenum.

3. A bearing for a shaft rotating slowly under a heavy load comprising a shaft, an annular bushing member disposed round said shaft, a plurality of channels disposed in and circumferentially arranged around the interior surface of said annular bushing member adjacent said shaft, a non-compressible lubricant of pasty consistency disposed in and substantially filling each channel on which said shaft rides and is supported, a sealing member disposed at the periphery of each channel to maintain said non-compressible lubricant therein, and filling means disposed in said annular bushing member in communication with each one of said channels to fill said channels with said non-compressible lubricant and to maintain said channels full therewith.

References Cited in the file of this patent

UNITED STATES PATENTS

| | | |
|---|---|---|
| 379,531 | Douglas | Mar. 13, 1888 |
| 2,149,983 | Smith | Mar. 7, 1939 |
| 2,578,713 | Martellotti | Dec. 18, 1951 |
| 2,869,933 | Bissinger | Jan. 20, 1959 |
| 2,908,177 | Powell | Oct. 13, 1959 |

FOREIGN PATENTS

| | | |
|---|---|---|
| 581,062 | Great Britain | Sept. 30, 1946 |